US012510608B2

(12) United States Patent
Choe et al.

(10) Patent No.: US 12,510,608 B2
(45) Date of Patent: Dec. 30, 2025

(54) METHOD AND APPARATUS FOR MEASURING SPIN-ORBIT TORQUE

(71) Applicants: SAMSUNG ELECTRONICS CO., LTD., Suwon-si (KR); Seoul National University R&DB Foundation, Seoul (KR)

(72) Inventors: Sug-Bong Choe, Seoul (KR); Jung-Hyun Park, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 942 days.

(21) Appl. No.: 17/679,874

(22) Filed: Feb. 24, 2022

(65) Prior Publication Data

US 2023/0076199 A1 Mar. 9, 2023

(30) Foreign Application Priority Data

Sep. 6, 2021 (KR) .................. 10-2021-0118272

(51) Int. Cl.
*G01R 33/032* (2006.01)
*G01N 21/21* (2006.01)
(Continued)

(52) U.S. Cl.
CPC ....... *G01R 33/0325* (2013.01); *G02F 1/0131* (2013.01); *H10B 61/00* (2023.02); *G01N 21/21* (2013.01)

(58) Field of Classification Search
None
See application file for complete search history.

(56) References Cited

FOREIGN PATENT DOCUMENTS

| KR | 10-2009-0034870 A | 4/2009 |
| KR | 10-2021-0040241 A | 4/2021 |

OTHER PUBLICATIONS

Sang-jun, Y. (2015). Spin Dynamics in Various Time Regimes: Study of spin dynamics in various time regimes. Thesis (Doctoral)—Seoul National University Graduate School: College of Natural Sciences, Department of Physics and Astronomy, 2015. 8. (Year: 2015).*

(Continued)

*Primary Examiner* — Uzma Alam
*Assistant Examiner* — Alexandria Mendoza
(74) *Attorney, Agent, or Firm* — NSIP Law (57) ABSTRACT

A spin-orbit torque (SOT) measuring apparatus includes a photoelastic modulator (PEM) configured to periodically modulate a polarization direction of linearly polarized incident light and emit a periodically modulated light, a first polarization rotator configured to rotate a polarization direction of the periodically modulated light, a voltage generator configured to generate an AC current to a sample to which light with the rotated polarization direction is to be emitted, a prism configured to split light reflected into first light and second light having different polarization directions, a balanced detector configured to output a signal corresponding to an intensity difference between the first light and the second light, a changing circuit configured to change a frequency component to the intensity difference, and an amplitude measurer configured to measure an amplitude of a frequency component corresponding to a modulation frequency of the PEM with the changed frequency component.

20 Claims, 7 Drawing Sheets

(51) Int. Cl.
*G02F 1/01* (2006.01)
*H10B 61/00* (2023.01)

(56) References Cited

OTHER PUBLICATIONS

Kim, J.S.. (2019) Consolidation of magneto-optic measurement methods for spin-torque quantification. Thesis (Doctoral)—Seoul National University Graduate School: College of Natural Sciences, Department of Physics and Astronomy, 2019. 2. (Year: 2019).*

Guimarães, F.S.M., Bouaziz, J., dos Santos Dias, M. et al. Spin-orbit torques and their associated effective fields from gigahertz to terahertz. Commun Phys 3, 19 (2020). https://doi.org/10.1038/s42005-020-0282-x (Year: 2020).*

Fan, Xin, et al. "All-optical vector measurement of spin-orbit-induced torques using both polar and quadratic magneto-optic Kerr effects." *Applied Physics Letters* vol. 109, issue 12, Sep. 21, 2016: (17 pages in English).

Marui, Yukihiro, et al. "Optical detection of spin orbit torque and current induced heating." *Applied Physics Express* vol. 11 No. 9 (2018): 093001.arXiv:1811.07118v1 [cond-mat.mes-hall] Nov. 2018 (5 pages in English).

Hirohata, Atsufumi, et al. "Review on spintronics: Principles and device applications." *Journal of Magnetism and Magnetic Materials* vol. 509, Mar. 7, 2020: 166711. (28 pages in English).

Montazeri, Mohammad, et al. "Magneto-optical investigation of spin-orbit torques in metallic and insulating magnetic heterostructures." *Nature communications* Dec. 8, 2015: (9 pages in English).

Joo-Sung Kim. "Consolidation of magneto-optic measurement methods for spin-torque quantification", Feb. 2019. (1 page in Korean and 100 pages in English).

Wan, Yi, et al. "Surface-sensitive magnetic characterization technique for ultrathin ferromagnetic film with perpendicular magnetic anisotropy." *AIP Advances* vol. 10, Issue No. 6 Jun. 12, 2020 (7 pages in English).

Kim, Joo-Sung, et al. "Artifact-free optical spin-orbit torque magnetometry." *Applied Physics Letters* vol. 114, issue 18, May 8, 2019 (6 pages in English).

Joo-Sung Kim. *Consolidation of magneto-optic measurement methods for spin-torque quantification.* Diss. The Graduate College of Natural Sciences Seoul National University, 2019.

Guimarães, Filipe SM, et al. "Spin-orbit torques and their associated effective fields from gigahertz to terahertz." Communications Physics 3.1 (2020): 19.

Sang-Jun Yun. *Spin Dynamics in Various Time Regimes.* Diss. The Graduate College of Natural Sciences Seoul National University, 2015.

Korean Office Action issued on May 1, 2025, in counterpart Korean Patent Application No. 10-2021-0118272(4 pages in English, 6 pages in Korean).

* cited by examiner

METHOD AND APPARATUS FOR MEASURING SPIN-ORBIT TORQUE

CROSS-REFERENCE TO RELATED APPLICATIONS

This application claims the benefit under 35 USC § 119(a) of Korean Patent Application No. 10-2021-0118272 filed on Sep. 6, 2021, in the Korean Intellectual Property Office, the entire disclosure of which is incorporated herein by reference for all purposes.

BACKGROUND

1. Field

The following description relates to a method and apparatus for measuring a spin-orbit torque (SOT).

2. Description of Related Art

The advent of the fourth industrial revolution has accelerated the research and development of semiconductors with various functions and purposes. Among these, a nanomagnetic thin film may have characteristics such as non-volatility, high-frequency bands, low power, and fast driving mechanics, and may thus be used in various fields including, for example, fifth-generation (5G), magnetic random access memory (MRAM), Internet of things (IoT), and neural processing units (NPUs).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a spin-orbit torque (SOT) measuring apparatus includes a photoelastic modulator (PEM) configured to periodically modulate a polarization direction of linearly polarized incident light and emit a periodically modulated light, a first polarization rotator configured to rotate a polarization direction of the periodically modulated light, a voltage generator configured to generate an alternating current (AC) voltage to provide an AC current to a sample to which light with the rotated polarization direction is to be emitted, a prism configured to split light reflected by the sample into first light and second light having different polarization directions, a balanced detector configured to output a signal corresponding to an intensity difference between the first light and the second light, a changing circuit configured to change a frequency component corresponding to a frequency of the AC voltage among frequency components included in the signal corresponding to the intensity difference, and an amplitude measurer configured to measure an amplitude of a frequency component corresponding to a modulation frequency of the PEM among frequency components included in a signal with the changed frequency component. A SOT generated in the sample in response to the AC current may be calculated based on the measured amplitude.

The PEM may perform the modulating by periodically changing the polarization direction of the linearly polarized incident light as linearly polarized light and circularly polarized light.

The changing circuit may change the frequency component corresponding to the frequency of the AC voltage by multiplying the frequency components included in the signal corresponding to the intensity difference by a frequency component corresponding to a frequency of the AC current applied to the sample.

The amplitude measurer may measure the amplitude of the frequency component corresponding to the modulation frequency of the PEM using a reference signal based on a period on which the polarization direction of the light is repeated as linearly polarized light and circularly polarized light in the PEM.

The changing circuit may change a frequency component corresponding to a frequency of the periodically modulated light among the frequency components included in the signal corresponding to the intensity difference, and the amplitude measurer may measure the amplitude of the frequency component corresponding to the modulation frequency of the PEM using a reference signal based on the frequency of the AC voltage.

The sample may include a plurality of thin films of a 3-layer structure having a thickness of nanometers, and a plurality of electrodes configured to supply the AC current to the thin films. The thin films may include a first thin film of heavy metal, a first magnetic thin film of ferromagnetic metal, and a second thin film of heavy metal. When current flows in a direction parallel to the electrodes, the rotated polarization direction may change by a change in a magnetized component in an axial direction orthogonal to the direction parallel to the electrodes in the first magnetic thin film.

A magnetic random-access memory (MRAM) may include the sample.

The SOT measuring apparatus may further include a beam splitter configured to refract, to the sample, at least a portion of the periodically modulated light.

The SOT measuring apparatus may further include a mirror configured to reflect the portion of the periodically modulated light refracted and transfer the portion of the periodically modulated light reflected to the prism.

The SOT measuring apparatus may further include a second polarization rotator configured to rotate a polarization direction of the light reflected by the sample such that the light reflected by the sample is included in a voltage range detectable by the balanced detector.

In another general aspect, a SOT measuring method includes periodically modulating a polarization direction of linearly polarized incident light and emitting a periodically modulated light, rotating a polarization direction of the periodically modulated light, generating an AC voltage to provide an AC current to a sample to which light with the rotated polarization direction is to be emitted, splitting light reflected by the sample into first light and second light having different polarization directions, outputting a signal corresponding to an intensity difference between the first light and the second light, changing a frequency component corresponding to a frequency of the AC voltage among frequency components included in a signal corresponding to the intensity difference, measuring an amplitude of a frequency component corresponding to a modulation frequency of a PEM among frequency components included in a signal with the changed frequency component, and calculating a SOT generated in the sample in response to the AC current based on the measured amplitude.

The modulating and the emitting may include performing the modulating by periodically changing the polarization direction of the linearly polarized incident light as linearly polarized light and circularly polarized light.

The changing of the frequency component may include changing the frequency component corresponding to the frequency of the AC voltage by multiplying the frequency components included in the signal corresponding to the intensity difference by a frequency component corresponding to a frequency of the AC current applied to the sample.

The measuring of the amplitude of the frequency component may include measuring the amplitude of the frequency component corresponding to the modulation frequency of the PEM, using a reference signal based on a period on which the polarization direction of the light is repeated as linearly polarized light and circularly polarized light in the PEM.

The changing of the frequency component may include changing the frequency component corresponding to the frequency of the periodically modulated light among the frequency components included in the signal corresponding to the intensity difference, and the measuring of the amplitude of the frequency component may include measuring the amplitude of the frequency component corresponding to the modulation frequency of the PEM, using a reference signal based on the frequency of the AC voltage.

The sample may include a plurality of thin films of a 3-layer structure having a thickness of nanometers, and a plurality of electrodes configured to supply the AC current to the thin films. The thin films may include a first thin film of heavy metal, a first magnetic thin film of ferromagnetic metal, and a second thin film of heavy metal. When current flows in a direction parallel to the electrodes, the rotated polarization direction may change by a magnetized component in an axial direction orthogonal to the direction parallel to the electrodes in the first magnetic thin film.

An MRAM may include the sample.

The SOT measuring method may further include refracting, to the sample, at least a portion of the periodically modulated light.

The SOT measuring method may further include rotating a polarization direction of the light reflected by the sample such that the light reflected by the sample is included in a preset voltage range.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "comprises," "includes," and "has" specify the presence of stated integers, steps, features, numbers, operations, members, elements, and/or combinations thereof, but do not preclude the presence or addition of one or more other integers, steps, features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when an element, such as a layer, region, or substrate, is described as being "on," "connected to," or "coupled to" the other element, it may be directly "on," "connected to," or "coupled to" the other component, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 1:
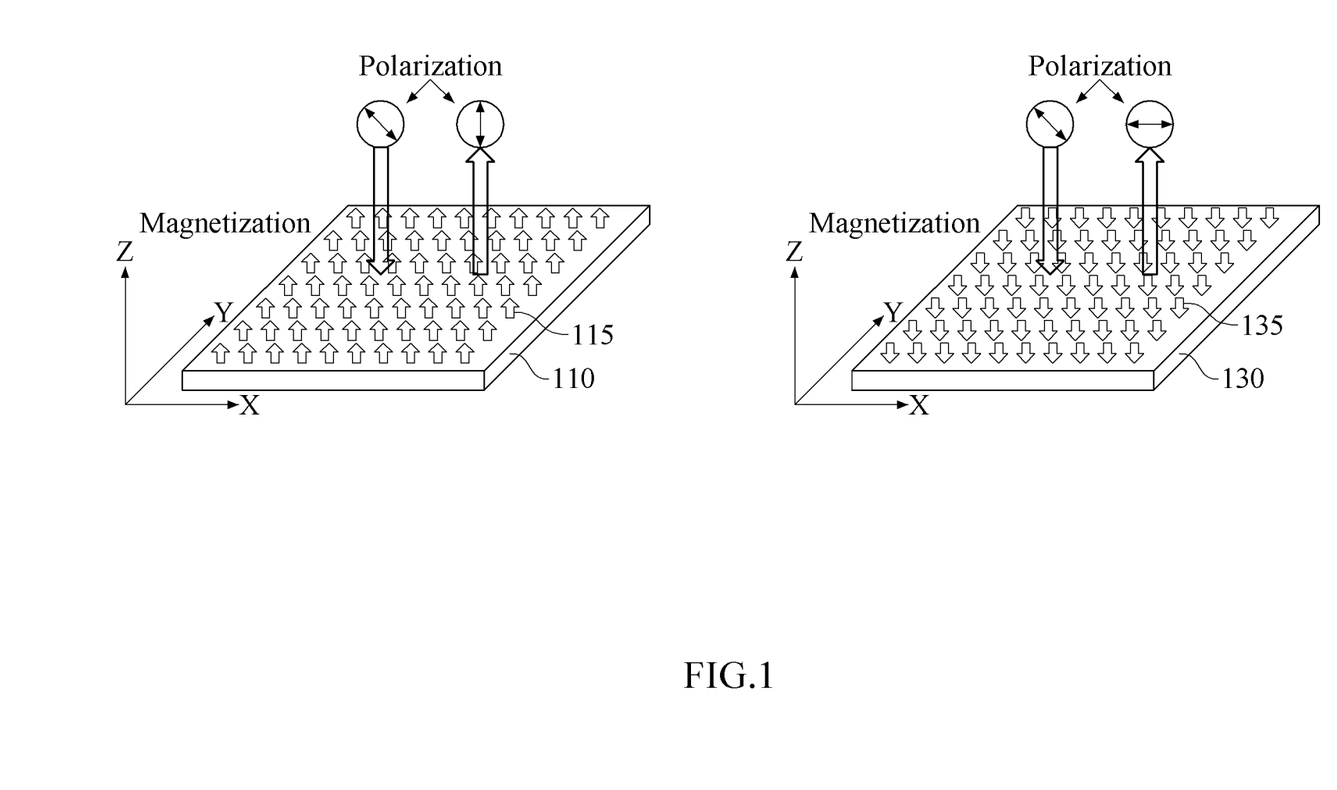
FIG. 1 illustrates an example of a change in a polarization direction occurring in a magnetic thin film.

FIG. 1 illustrates an example of a change in a polarization direction occurring in a magnetic thin film. Referring to FIG. 1, illustrated are a polarization direction 115 before a polarized laser (beam) is incident on a magnetic thin film 110 and a polarization direction 135 after a polarized laser (beam) is incident on a magnetic thin film 130.

To measure a magnetization direction in a magnetic layer such as the magnetic thin film 110, the polarized laser may be input to a surface of the magnetic thin film 110. The polarized laser may have, for example, an x component (e.g., S-wave) and a y component (e.g., P-wave), and may thus be used to observe an interaction between a sample and light based on a change in an angular component.

For example, when the polarized laser is reflected after being incident on the surface of the magnetic layer of the magnetic thin film 110 that is magnetized, the polarization direction 115 may change to the polarization direction 135 due to a difference between the incident light and the reflected light. Such a change occurring between the incident light and the reflected light may be referred to as a magneto-optic Kerr effect (MOKE). In addition, a polar MOKE (pMOKE) may refer to a case in which a direction in which an object is magnetized is parallel to a plane of incidence (or a plane of reflection) of light and vertical to a surface of the object.

A MOKE-based signal may be represented as Equation 1 below, for example.

$$\text{MOKE} \propto \alpha_{pMOKE} m_z + \beta_{PHE} m_x m_y \qquad \text{[Equation 1]}$$

In Equation 1, $\alpha_{pMOKE}$ may correspond to a pMOKE-based signal. A pMOKE may be proportional to $m_z$. For example, $m_z$ may correspond to a magnetized component in a z-axis direction present in a magnetic thin film 220 to be described later with reference to FIG. 2. For the magnetized component in the z-axis direction, an up-spin may be defined as 1, and a down-spin may be defined as 0.

In addition, $\beta_{PHE}$ may correspond to a planar Hall effect (PHE), and the PHE may be proportional to a product obtained by a multiplication between $m_x$ and $m_y$. The PHE may refer to a phenomenon in which a voltage such as a Hall effect is measured when a magnetic field is applied to a magnetic layer in a planar direction, that is, a phenomenon in which an electric field is generated in a direction orthogonal to a current in the same plane as the magnetic field including a direction of the current. For example, $m_x$ may correspond to a magnetized component in an x-axis direction present in the magnetic thin film 220 to be described later with reference to FIG. 2, and $m_y$ may correspond to a magnetized component in a y-axis direction present in the magnetic thin film 220 to be described later with reference to FIG. 2.

In an example, by measuring a polarization direction changed by the pMOKE, it is possible to measure a change in a magnetization direction, and calculate or measure a spin-orbit torque (SOT) which may be a cause of generating such a change in the magnetization direction. The SOT will be described in detail hereinafter with reference to FIG. 2.

Figure 2:
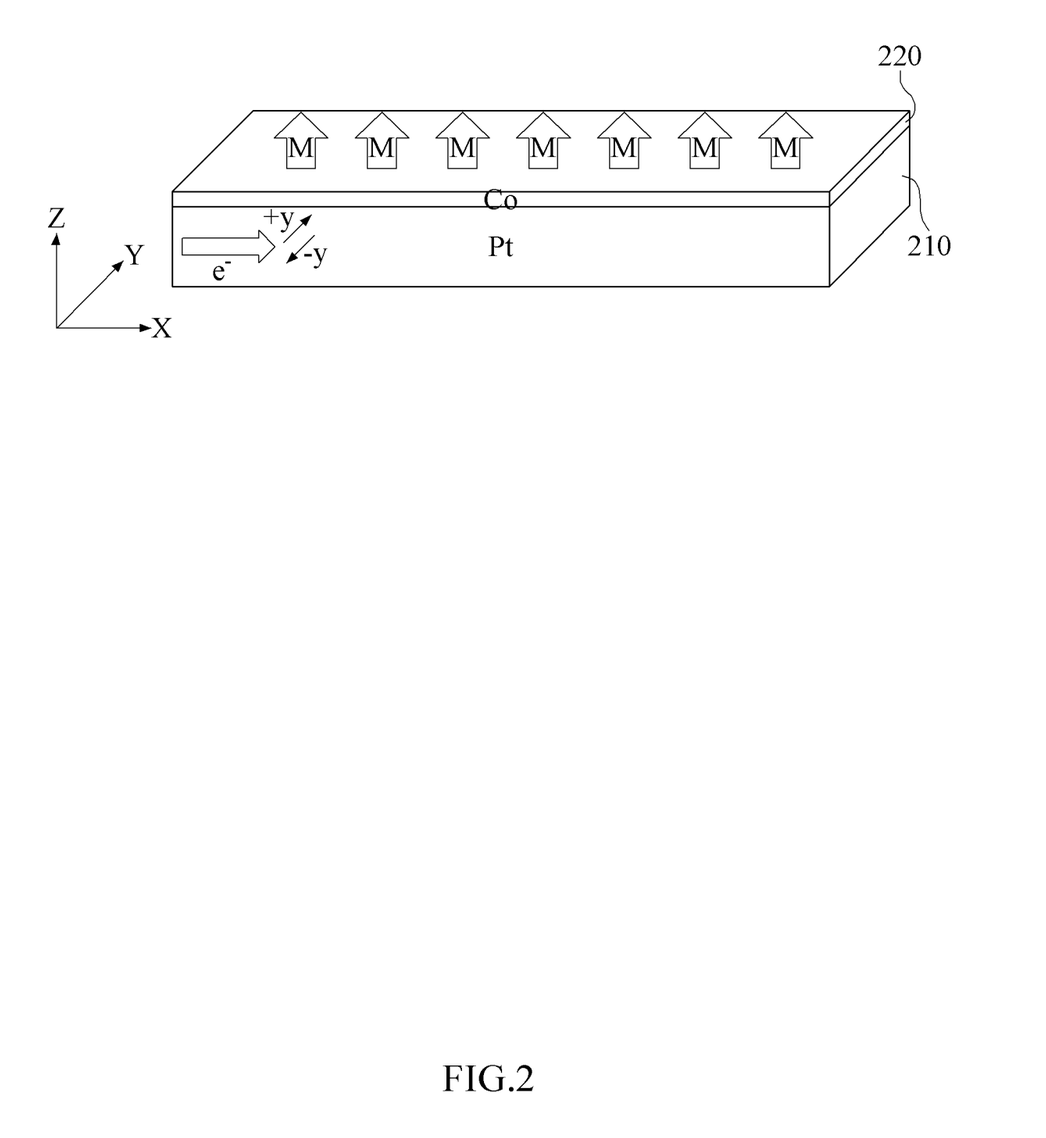
FIG. 2 illustrates an example of a spin-orbit torque (SOT).

FIG. 2 illustrates an example of a SOT. Referring to FIG. 2, illustrated is an example sample including a nonmagnetic thin film of heavy metal (e.g., a platinum (Pt) thin film 210) and a magnetic thin film (e.g., a cobalt (Co) thin film 220). For example, the Co thin film 220 may include a magnetic layer with nanometers thickness.

Here, the magnetization of the Co thin film 220 may be controlled by allowing a current to flow in a planar direction of a multilayer thin-film structure of the Pt thin film 210 and the Co thin film 220.

For example, when a current flows into the multilayer thin-film structure of the Pt thin film 210 and the Co thin film 220, spin-dependent scattering in conduction electrons may occur due to spin-orbit coupling. In this example, a scattering direction may change by a spin state of the conduction electrons, and thus a spin Hall effect (SHE) may occur as spin-up electrons are accumulated on one side, and spin-down electrons are accumulated on the opposite side.

The spin-orbit coupling may be proportional to an atomic number to the fourth power, and thus an electron flowing in the Pt thin film 210, which is a film of heavy metal, may have a path that is changed due to potential energy by strong spin-orbit coupling. Such a change in a path of an electron (hereinafter simply "electron path") by the spin-orbit coupling may be referred to as a spin Hall effect (SHE).

When the SHE occurs in the Pt thin film 210 as a current is applied, an electron path in the Pt thin film 210 may change to be vertical to a direction of the current (hereinafter simply "current direction").

For example, under the assumption that the current path is x and an axis of a path change by the spin-orbit coupling is y, and an electron spin lies in two directions (e.g., +y (up spin) and −y (down spin)) along the y axis, a direction of the path change may be divided into +z or −z based on a direction of the electron spin. The path may be divided based on the direction of the electron spin, and thus a spin in one direction may be injected into a magnetic layer. This may indicate that the electron spin is completely polarized in the y axis and flows into the z-direction accordingly. Spins in a specific direction injected as described above may transfer torque to the magnetic layer of the Co thin film 220.

An electric charge flow in an x-direction may generate a spin current flowing into a z-direction with a y spin. Such a phenomenon may be referred to as a charge-to-spin conversion (CSC). The CSC may occur due to the spin-orbit coupling, and thus a spin torque by the CSC may be referred to as a spin-orbit torque (SOT).

That is, by the SHE generated in the Pt thin film 210, an electron having a spin in a specific direction (e.g., ±y direction) may be transferred to the Co thin film 220. In this case, the Co thin film 220 corresponding to the magnetic layer may receive an angular momentum of the electron having the spin to change a magnetization direction of the magnetic layer. A force that changes a magnetization direction of a magnetic layer such as the Co thin film 220 by receiving an angular momentum of an electron having a spin of a specific direction may correspond to a SOT. The SOT may have a magnitude that depends on an amount of a converted spin, and the amount of a spin current may be proportional to a dimensionless constant that is referred to as a spin Hall angle (SHA).

The SOT using a current may switch magnetization without a magnetic field and may thus be applied to a magnetic memory device such as a magnetic random-access memory (MRAM). The SOT may be generated as a spin angular momentum generated when a current is applied to a magnetic thin film is transferred to magnetization, and rapidly switch magnetization with low energy consumption. By measuring rapidly and accurately the SOT, it is possible to apply a SOT-based MRAM to an electronic device.

In an example, an optical measuring method using a change in a polarization direction of a laser by the MOKE may be used to measure a change in a magnetization direction and quantitatively calculate a magnitude of a SOT. An amount of the change in the polarization direction may vary based on the magnetization direction. The MOKE may be proportional to, for example, an angular component ($m_z$) in a z-direction of magnetization that is present in a magnetic thin film (e.g., the Co thin film 220). A spin component ($m_z$) in the z-direction may be given as a value that varies between −1 and 1, for example.

Figure 3:
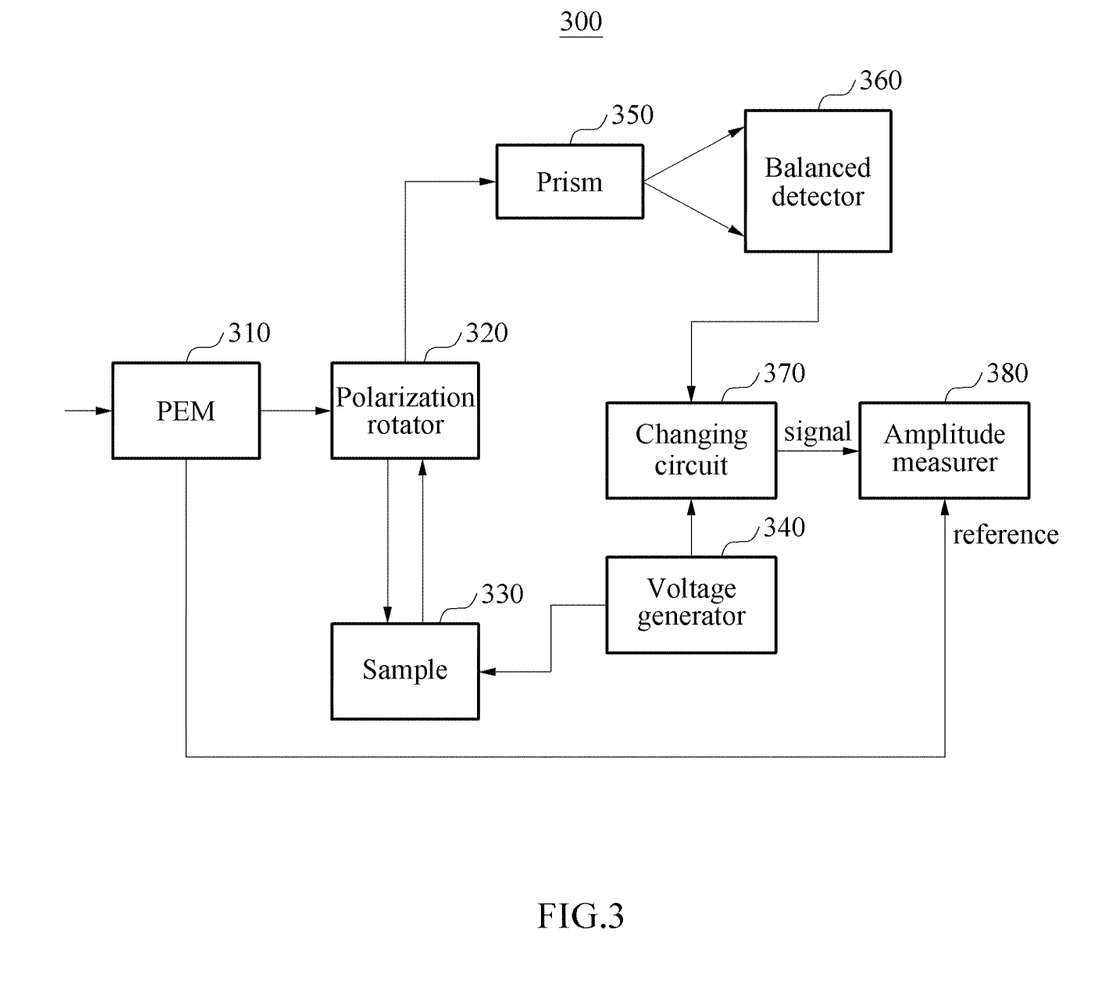
FIG. 3 illustrates an example of a SOT measuring apparatus.

FIG. 3 illustrates an example of a SOT measuring apparatus. Referring to FIG. 3, a SOT measuring apparatus 300 may include a photoelastic modulator (PEM) 310, a polarization rotator 320, a voltage generator 340, a prism 350, a balanced detector 360, a changing circuit 370, and an amplitude measurer 380.

The PEM 310 may periodically modulate a polarization direction of linearly polarized light that is incident on the SOT measuring apparatus 300 and emit the periodically modulated light. Here, "periodically modulating a polarization direction of linearly polarized incident light and emitting the periodically modulated light" may be construed as, by modulating the linearly polarized incident light into circularly polarized light by a specific frequency, alternately emitting, on a periodic basis, the incident light and the modulated light, for example, the linearly polarized incident light, the modulated circularly polarized light, and the linearly polarized incident light.

The PEM 310 may perform the modulation by periodically changing the polarization direction such that the polarization direction of the linearly polarized light incident on the SOT measuring apparatus 300 is repeated as linearly polarized light and circularly polarized light. The light periodically modulated and emitted by the PEM 310 may interact with the magnetization of a magnetic thin film to change polarization, and may thereby remove a planar Hall effect (PHE).

In an example, using the PEM 310, it is possible to remove the PHE which may be an obstacle in measuring a SOT and more accurately measure an anomalous Hall effect (AHE).

In addition, the AHE may correspond to a phenomenon in which an electron moves by being bent in a direction vertical to an electric field by local magnetization without an external magnetic field. In general, when a magnetic field is applied from the outside in a state where a current is applied to conductor and semiconductor materials, an electron is bent by a Lorentz force, and electric charges are accumulated on a boundary surface of the material. This may be referred to as a Hall effect. In contrast, the AHE may be a phenomenon occurring in a ferromagnetic material having a magnetization value (Mz), and its principle is as follows.

As described above, spin-dependent scattering may occur in conduction electrons due to spin-orbit coupling, and a direction of the scattering may change by a spin state of the electrons, resulting in a SHE. The AHE may be a phenomenon in which a conduction electron experiences the Lorentz force by localized magnetization, and an electron that is not spin-aligned moves in one direction. The AHE may also be referred to as an anomalous Hall effect. The operations of the PEM 310 will be described in detail later with reference to FIG. 4.

The polarization rotator 320 may rotate a polarization direction of the light periodically modulated and emitted by the PEM 310. The polarization rotator 320 may provide light with the rotated polarization direction to a sample 330. The polarization rotator 330 may be, but is not limited to, a half-wave plate (HWP).

The sample 330 may be, but is not limited to, a MRAM using a magnetic tunnel junction, or a magnetic racetrack memory. The sample 330 may correspond to a functional unit (e.g., a memory cell) of an MRAM that stores therein information by changing a rotation (or spin) direction of a magnetization that stores information in the memory while rotating around a specific direction. A structure of the sample 330 will be described in detail later with reference to FIG. 5.

The voltage generator 340 may generate an alternating current (AC) voltage to provide an AC current to the sample 330 to which the light with the polarization direction rotated by the polarization rotator 320 is emitted. The voltage generator 340 may correspond to, for example, a function generator 640 to be described later with reference to FIG. 6.

For example, under the assumption that a direct current (DC) current is applied to the sample 330, the SOT measuring apparatus 300 may measure a signal by the current using a difference between a signal output when a current in a +x direction is applied and a signal output when a current in a −x direction is applied. In this example, a drift error may occur while a direction of the current is being changed. The drift error may prevent the accurate measurement of the signal by the current because a mean value difference in each interval changes greatly compared to an original signal. In addition, when the DC current is applied to the sample 330, a relatively great amount of time may be used to change the direction of the current and measure the mean value. In an example, by applying the AC current to the sample 330, it is possible to prevent the occurrence of the drift error that may occur when the DC current is applied, thereby increasing the accuracy in measuring or calculating a SOT and reducing the amount of time used for the measuring.

In addition, by applying the AC voltage to the sample 330 and measuring a reflected AC signal, it is possible to reduce noise that may occur in a different frequency band.

As the AC voltage generated by the voltage generator 340 is applied, light reflected by the sample 330, that is, light with the changed polarization direction, may be transferred to the prism 350 via the polarization rotator 320.

The prism 350 may split the light reflected by the sample 330 into first light and second light having different polarization directions. The prism 350 may be, but is not limited to, a Wollaston prism.

The balanced detector 360 may output a signal corresponding to an intensity difference between the first light and the second light split by the prism 350. The signal corresponding to the intensity difference between the first light and the second light may be output as a signal in the form of a voltage.

The changing circuit 370 may change a frequency component corresponding to a frequency of the AC voltage among frequency components included in the signal corresponding to the intensity difference output by the balanced detector 360. The changing circuit 370 may change the frequency component corresponding to the frequency of the AC voltage by multiplying, by a frequency component corresponding to a frequency of the AC current applied to the sample 330, the frequency components included in the signal corresponding to the intensity difference output by the balanced detector 360.

For example, the changing circuit 370 may multiply the signal (intensity difference) of the balanced detector 360 by a voltage having the same frequency as the AC current flowing in the sample 330 or multiply the signal (intensity difference) of the balanced detector 360 by a voltage having the same frequency as a frequency of the PEM 310, and transfer a corresponding result to the amplitude measurer 380. The changing circuit 370 may correspond to, for example, a multiplier 670 to be described later with reference to FIG. 6.

The amplitude measurer 380 may measure an amplitude of a signal transferred from the changing circuit 370 by using, as a reference signal, the signal of the PEM 310 or the AC current flowing in the sample 330. In an example, using the AC current, a random error may occur at a specific frequency, instead of a random error occurring in all frequency bands, and a drift error may be fundamentally prevented, which enables more rapid and accurate measurement of a SOT. The amplitude measurer 380 may correspond to, for example, a lock-in amplifier 680 to be described later with reference to FIG. 6.

The amplitude measurer 380 may measure an amplitude of a frequency component corresponding to a modulation frequency of the PEM 310 among frequency components included in a signal with the frequency component changed by the changing circuit 370. The amplitude measurer 380 may measure the amplitude of the frequency component corresponding to the modulation frequency of the PEM 310 using a reference signal that is based on a period on which the polarization direction of the light is repeated as linearly polarized light and circularly polarized light in the PEM 310. As will be described hereinafter with reference to FIG. 6, the amplitude measured by the amplitude measurer 380 may be $-\alpha_{pMOKE} \sin \theta_m \Delta \theta_m$, for example.

The SOT measuring apparatus 300 may calculate and output a SOT that may occur in the sample 330 in response to the AC current, based on the amplitude measured by the amplitude measurer 380.

Figure 4:
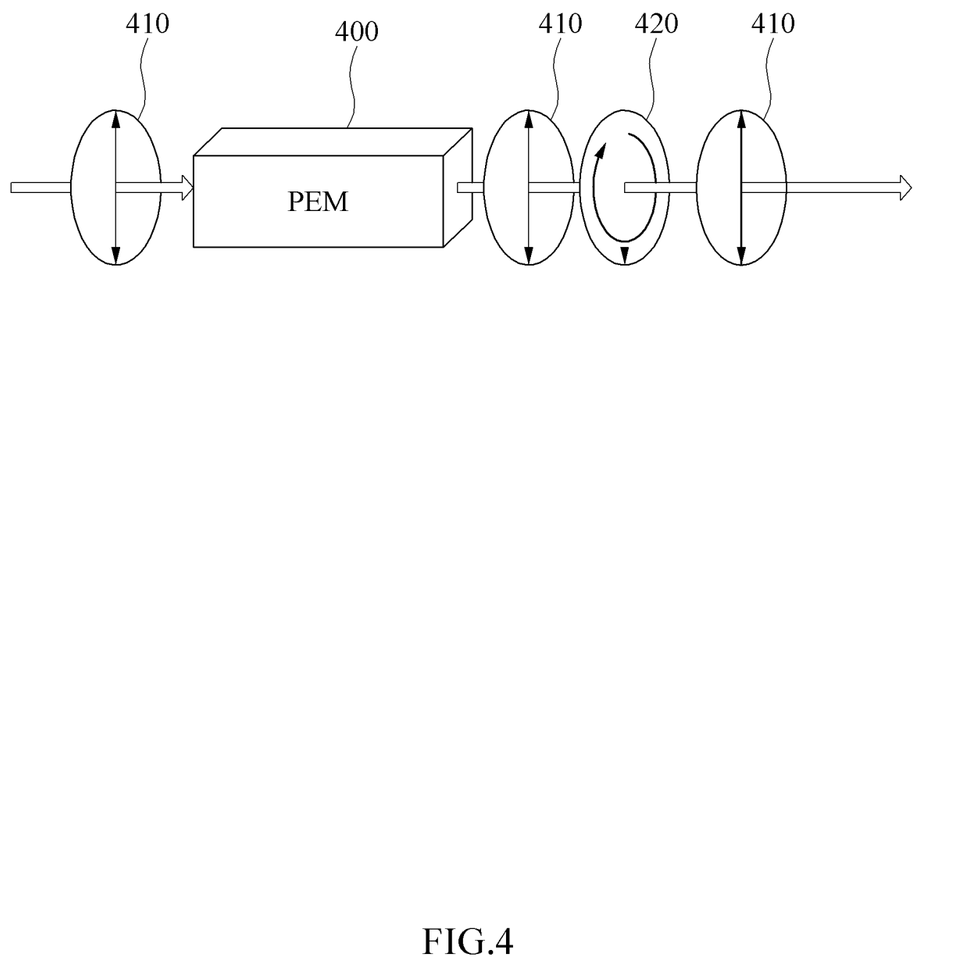
FIG. 4 illustrates an example of steps of a photoelastic modulator (PEM).

FIG. 4 illustrates an example of steps of a PEM. Referring to FIG. 4, after a PEM 400 periodically modulates linearly polarized light 410 that is incident on the PEM 400, the PEM 400 may alternately emit, in sequential order, the linearly polarized light 410 that is not modulated, circularly polarized light 420 that is modulated, and the linearly polarized light 410 that is not modulated.

The PEM 400 may periodically perform the modulation on the linearly polarized light 410. When the PEM 400 does not perform the modulation, the PEM 400 may output the linearly polarized light 410, which is the original light on which the modulation is not performed. When the PEM 400 performs the modulation, the PEM 400 may output the circularly polarized light 420 that is modulated from the original light. The PEM 400 may alternately emit the linearly polarized light 410 that is the original light, and the circularly polarized light 420 that is the modulated light periodically.

The light that is alternately and periodically emitted from the PEM 400 may interact with the magnetization of a magnetic thin film such as a cobalt thin film (e.g., the Co thin film 220 of FIG. 2) to change a polarization direction.

For example, when the PEM 400 is not used, a polarization rotator, such as, for example, an HWP, may be used to remove a PHE. In this example, a polarization direction of light may need to be rotated variously using the polarization rotator, which may consume a relatively great amount of time.

In an example, using the PEM 400 configured to perform modulation on the linearly polarized light 410 on a periodic basis, it is possible to fundamentally prevent the PHE, and reduce time used for rotating a polarization direction of light when using the polarization rotator.

Figure 5:
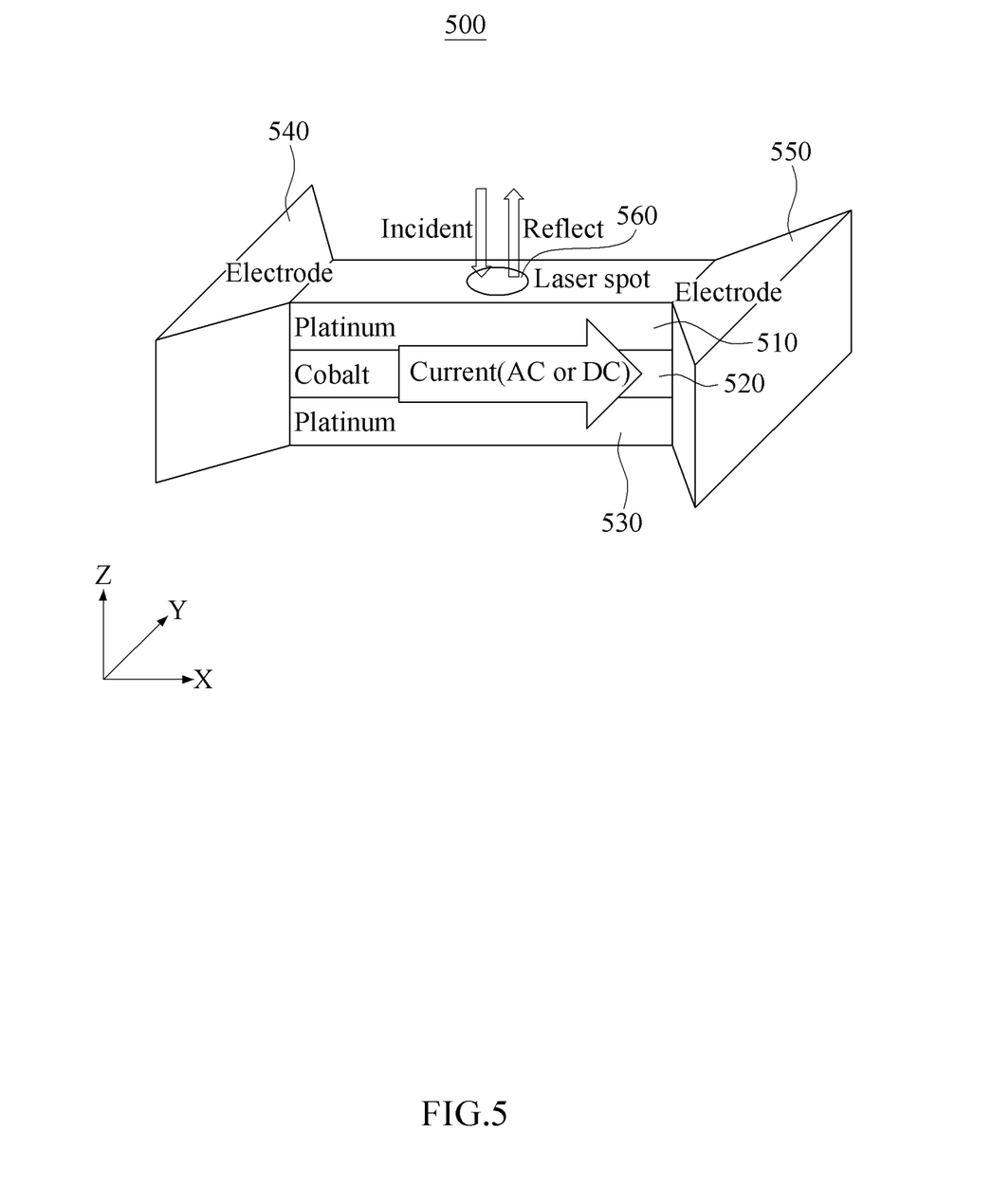
FIG. 5 illustrates an example of a sample.

FIG. 5 illustrates an example of a sample. Referring to FIG. 5, a sample 500 may include thin films 510, 520, and 530 of a 3-layer structure, and electrodes 540 and 550 configured to supply an AC current to the thin films 510, 520, and 530.

The thin film 510 may be a first thin film of heavy metal, the thin film 520 may be a first magnetic thin film of a ferromagnetic metal, and the third film 530 may be a second thin film of heavy metal. The thin films 510, 520, and 530 may have the thickness of nanometers, for example, 1 to 5 nanometers, but examples of which are not limited thereto.

The thin films 510 and 530 may be thin films of heavy metal among nonmagnetic metals. The thin film 510 may be, but is not limited to, a thin film of heavy metal, such as, for example, platinum (Pt), tungsten (W), aluminum oxide, tantalum (Ta), and the like. The thin films 510 and 530 may be thin films of the same heavy metal or of different heavy metals. For example, the thin film 510 may be a Pt thin film, and the thin film 530 may be a W thin film. The thin film 520 may be, but is not limited to, a thin film of a ferromagnetic metal, such as, for example, cobalt (Co), iron (Fe), nickel (Ni), lithium (Li), and the like. The sample 500 may be of a sandwich structure in which a heavy metal thin film, a magnetic thin film, and a heavy metal thin film are sandwiched.

When a current is applied in a direction parallel to the electrodes 540 and 550 in the sample 500, electrons separated from the thin films 510 and 530 may be provided to the thin film 520. In this case, a direction of spin flowing into the thin film 520 from the thin film 510 and a direction of a current flowing into the thin film 520 from the thin film 530 may be opposite to each other. Thus, by increasing or decreasing the thickness of one of the thin films 510 and 530, an amount of an electron spin to be transferred may not be zero. By the electron spin transferred from the thin films 510 and 530, vibration of magnetization may occur in the magnetic thin film 520.

For example, when incident light (e.g., laser) that is linearly polarized by an angle of 45 degrees (°) is input through a laser spot 560, reflected light with a polarization direction changed depending on a magnetization direction in the thin film 520 may be output from the thin film 520. A SOT measuring apparatus may then calculate a change in magnetization by a current by measuring a change in polarization of the reflected light.

Figure 6:
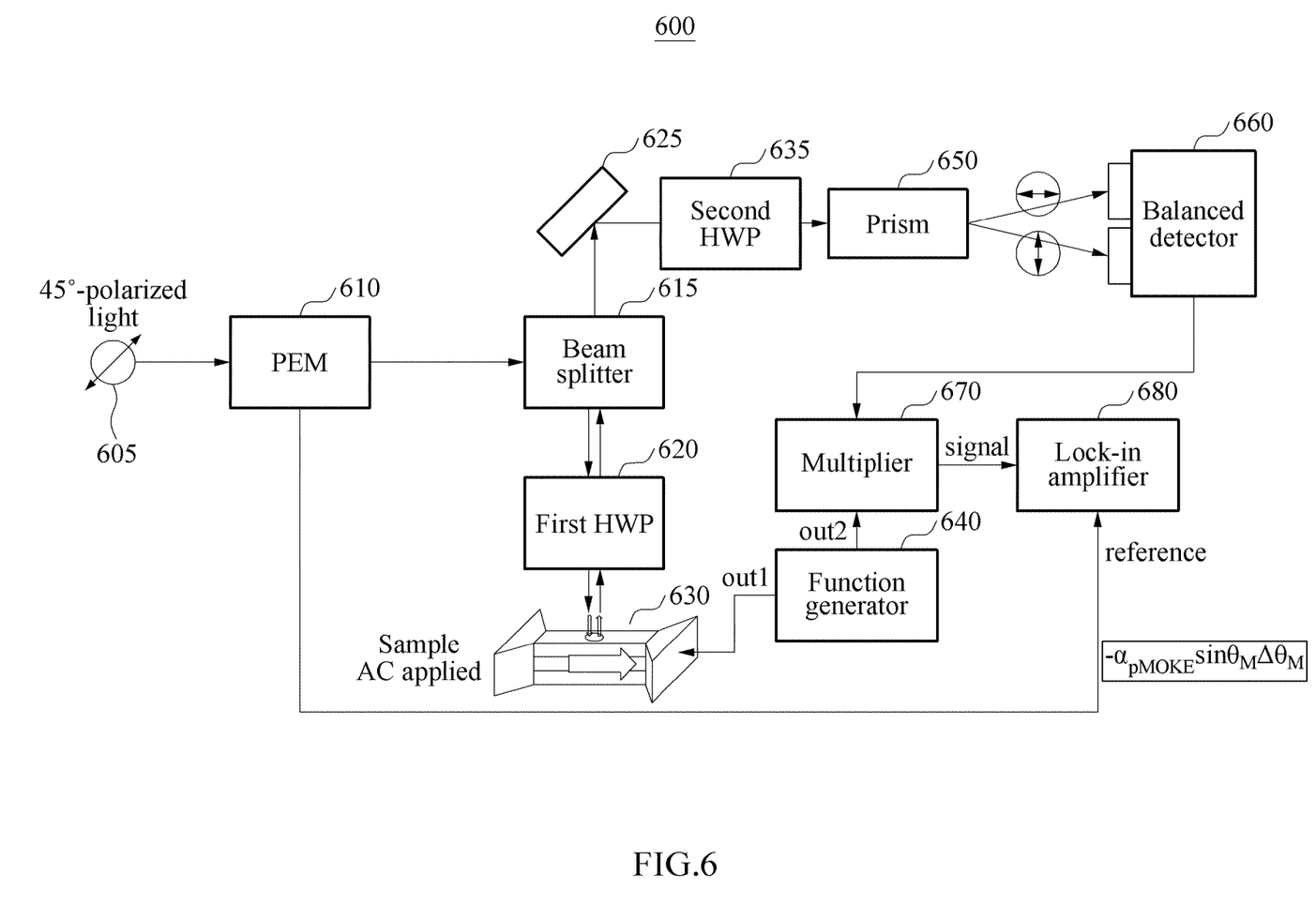
FIG. 6 illustrates another example of a SOT measuring apparatus.

FIG. 6 illustrates another example of a SOT measuring apparatus. Referring to FIG. 6, a SOT measuring apparatus 600 may include a PEM 610, a beam splitter 615, a first HWP 620, a mirror 625, a sample 630, a second HWP 635, a function generator 640, a prism 650, a balanced detector 660, a multiplier 670, and a lock-in amplifier 680.

The PEM 610 may periodically modulate and emit a polarization direction of 45° linearly polarized light 605 that is incident on the SOT measuring apparatus 600. The PEM 610 may perform the modulation by periodically changing the polarization direction such that the polarization direction of the 45° linearly polarized incident light 605 is repeated as linearly polarized light and circularly polarized light. A frequency of the PEM 610 may be ω, for example.

The beam splitter 615 may refract at least a portion of light periodically modulated and emitted by the PEM 610. The beam splitter 615 may be a spectroscope configured to reflect a portion of incident light. The beam splitter 615 may transfer the refracted light to the first HWP 620.

The first HWP 620 may rotate a polarization direction of the light refracted by the beam splitter 615 and provide light with the rotated polarized direction to the sample 630. The first HWP 620 may correspond to, for example, the polarization rotator 320 described above with reference to FIG. 3.

The function generator 640 may generate an AC voltage to provide an AC current to the sample 630 to which the light with the polarization direction rotated by the first HWP 620 is emitted.

As the AC voltage is applied, light reflected by the sample 630, that is, light with a changed polarization direction, may be refracted by the beam splitter 615 and then be transferred to the mirror 625.

The mirror 625 may reflect the light refracted by the beam splitter 615 and transfer the reflected light to the prism 650 via the second HWP 635. The second HWP 635 may transfer the reflected light to the prism 650 by rotating a polarization direction of the light reflected by the sample 630 such that the light reflected by the sample 630 is included in a voltage range detectable by the balanced detector 660.

The prism 650 may split the light reflected by the sample 630 into first light and second light having perpendicular polarization directions, and transfer the split light to the balanced detector 660. The prism 650 may be, but is not limited to, a Wollaston prism.

The balanced detector 660 may output, to the multiplier 670, a signal corresponding to an intensity difference between the first light and the second light split by the prism 650. The signal corresponding to the intensity difference between the first light and the second light may be output as a signal in the form of a voltage. The signal output from the balanced detector 660 to the multiplier 670 may be $-\alpha_{pMOKE} \sin \theta_m \Delta\theta_m \sin 2\omega t \sin ft$, for example. In this example, $\alpha_{pMOKE}$ may be a coefficient of an AHE. $\theta_m$ may be a polar angle of magnetization. In addition, $\Delta\theta_m$ may be an angle changed by a SOT, that is, an amount of an angular change. ω may be a frequency of the PEM 610, and f may be a frequency of a signal generated by the function generator 640.

The multiplier 670 may change a frequency component corresponding to a frequency of the AC voltage among frequency components included in the signal corresponding to the intensity difference output by the balanced detector 660. For example, the multiplier 670 may change the frequency component corresponding to the frequency of the AC voltage by multiplying, by a frequency component corresponding to a frequency of the AC current applied to the sample 630, the frequency components included in the signal corresponding to the intensity difference output by the balanced detector 660. The multiplier 670 may transfer a signal with the changed frequency component to the lock-in amplifier 680. The signal transferred from the multiplier 670 to the lock-in amplifier 680 may be, for example, $$-\alpha_{pMOKE} \sin\theta_m \Delta\theta_m \sin 2\omega t \frac{1 - \cos 2ft}{2}.$$

The lock-in amplifier 680 may measure an amplitude of a frequency component corresponding to a modulation frequency of the PEM 610 among frequency components included in the signal with the frequency component changed by the multiplier 670. The lock-in amplifier 680 may measure the amplitude of the frequency component corresponding to the modulation frequency of the PEM 610, using a reference signal that is based on a period on which the light is repeated as linearly polarized light and circularly polarized light in the PEM 610. The signal output from the lock-in amplifier 680 may be, for example, $$-\frac{\alpha_{pMOKE}}{2} \sin\theta_m \Delta\theta_m,$$

and the amplitude may be, for example, $-\alpha_{pMOKE} \sin \theta_m \Delta\theta_m$.

According to examples, the frequency ω of the PEM 610 and the frequency f of the signal generated by the function generator 640 may be replaced with each other to be used.

For example, the SOT measuring apparatus 600 may provide, as a reference signal of the lock-in amplifier 680, the frequency f of the signal generated by the function generator 640 in replacement of the frequency ω of the PEM 610, and input the frequency ω to the multiplier 670 to allow the lock-in amplifier 680 to measure the amplitude of the frequency component corresponding to the modulation frequency of the PEM 610.

For example, the multiplier 670 may change the frequency component corresponding to the frequency of the light periodically modulated and emitted by the PEM 610 among the frequency components included in the signal corresponding to the intensity difference. The lock-in amplifier 680 may measure the amplitude of the frequency component corresponding to the modulation frequency of the PEM 610 using the reference signal that is based on the AC voltage generated by the function generator 640.

The SOT measuring apparatus 600 may calculate and output a SOT that is generated in the sample 630 in response to the AC current, based on the amplitude measured by the lock-in amplifier 680.

In an example, the SOT measuring apparatus 600 may measure a pMOKE, and/or measure a degree of vertical magnetization of a surface of a sample by analyzing the polarization of light reflected from the surface of the sample.

Figure 7:
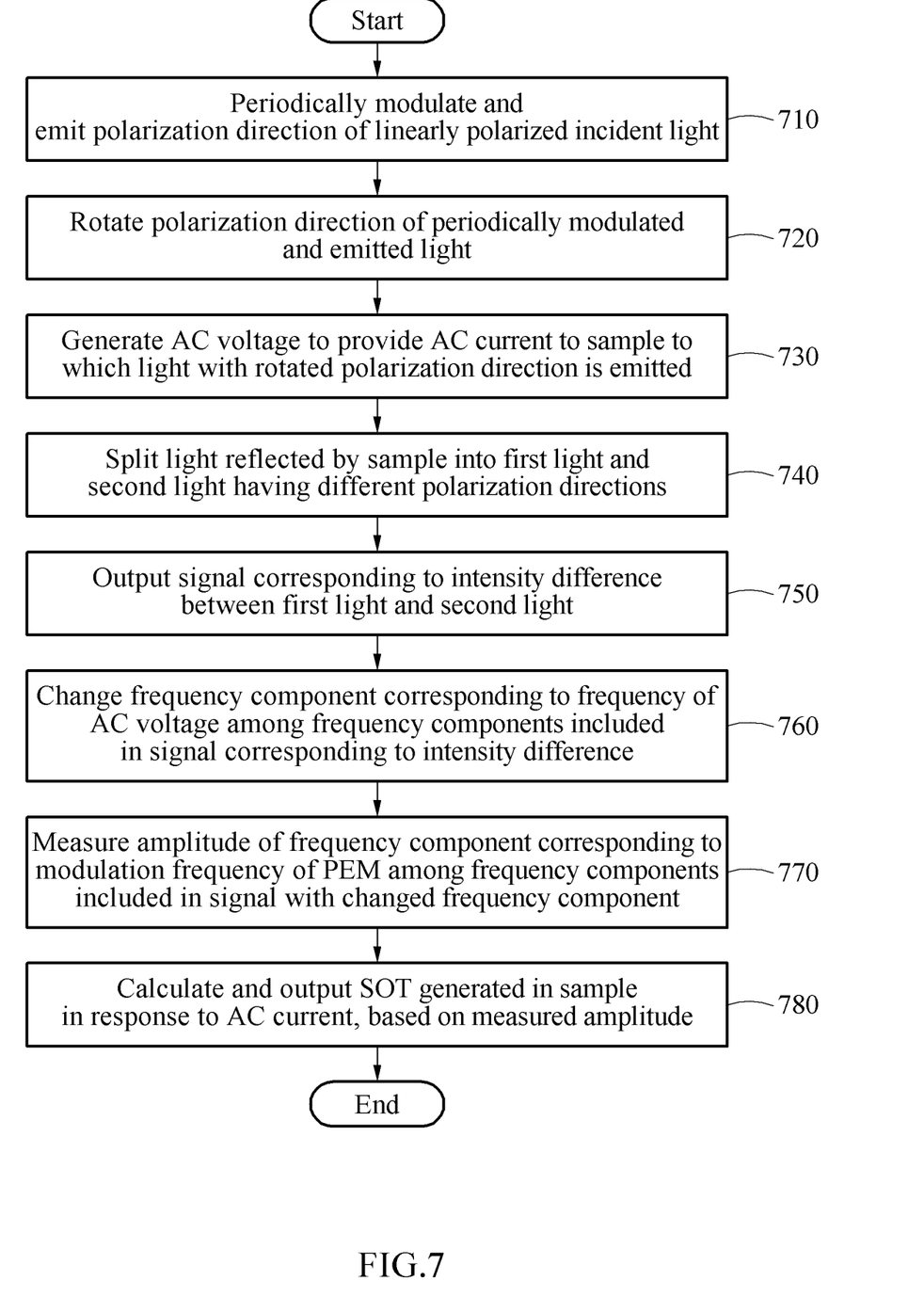
FIG. 7 illustrates an example of a SOT measuring method.

FIG. 7 illustrates an example of a SOT measuring method. Operations to be described hereinafter with reference to FIG. 7 may be performed sequentially, but are not necessarily performed sequentially. For example, the order of the operations may be changed and at least two of the operations may be performed in parallel.

Referring to FIG. 7, a SOT measuring apparatus may calculate a SOT by performing operations 710 through 780. The SOT measuring apparatus may be, for example, the SOT measuring apparatus 300 described above with reference to FIG. 3, or the SOT measuring apparatus 600 described above with reference to FIG. 6.

In operation 710, the SOT measuring apparatus may periodically modulate and emit a polarization direction of linearly polarized incident light. The SOT measuring apparatus may perform the modulation by periodically changing the polarization direction such that the polarization direction of the linearly polarized incident light is repeated as linearly polarized light and circularly polarized light.

In operation 720, the SOT measuring apparatus may rotate a polarization direction of light periodically modulated and emitted in operation 710. The SOT measuring apparatus may refract, to a sample, at least a portion of the light periodically modulated and emitted in operation 710, and then rotate a polarization direction of the refracted light.

In operation 730, the SOT measuring apparatus may generate an AC voltage to provide an AC current to the sample to which light with the polarization direction rotated in operation 720 is emitted. The sample may be, for example, the sample 400 described above with reference to FIG. 4, but is not limited thereto. The sample may correspond to, for example, a functional unit of an MRAM.

In operation 740, the SOT measuring apparatus may split light reflected by the sample into first light and second light having different polarization directions. For example, the SOT measuring apparatus may reflect the light refracted in operation 720 by a reflector (e.g., a mirror) and transfer the reflected light to a prism, and may thereby split the light reflected by the sample into the first light and the second light having the different polarization directions.

According to examples, the SOT measuring apparatus may rotate the polarization direction of the light reflected by the sample such that the light reflected by the sample is included in a preset voltage range, reflect light with the rotated polarization direction by the reflector, and transfer the reflected light to the prism. The preset voltage range may correspond to, for example, a voltage range detectable by a balanced detector.

In operation 750, the SOT measuring apparatus may output a signal corresponding to an intensity difference between the first light and the second light split in operation 740.

In operation 760, the SOT measuring apparatus may change a frequency component corresponding to a frequency of the AC voltage among frequency components included in the signal corresponding to the intensity difference output in operation 750. For example, the SOT measuring apparatus may change the frequency component corresponding to the frequency of the AC voltage by multiplying the frequency components included in the signal corresponding to the intensity difference output in operation 750 by a frequency component corresponding to a frequency of the AC current applied to the sample.

In operation 770, the SOT measuring apparatus may measure an amplitude of a frequency component corresponding to a modulation frequency of a PEM among frequency components included in a signal with the frequency component changed in operation 760. For example, the SOT measuring apparatus may measure the amplitude of the frequency component corresponding to the modulation frequency of the PEM, using a reference signal that is based on a period on which the polarization direction of the light is repeated as linearly polarized light and circularly polarized light.

In operation 780, the SOT measuring apparatus may calculate and output a SOT that is generated in the sample in response to the AC current generated in operation 730, based on the amplitude measured in operation 770.

According to examples, the SOT measuring apparatus may replace the modulation frequency of the PEM with a frequency of a signal generated by a function generator, and use the frequency of the signal generated by the function generator.

In this case, in operation 760, the SOT measuring apparatus may change a frequency component corresponding to a frequency of the light periodically modulated and emitted by the PEM among the frequency components included in the signal corresponding to the intensity difference output in operation 750. In operation 770, the SOT measuring apparatus may measure an amplitude of a frequency component corresponding to the modulation frequency of the PEM using a reference signal that is based on the frequency of the AC voltage generated in operation 730.

The SOT measuring apparatus, SOT measuring apparatus 300, 600, PEM 310, 400, polarization rotator 320, voltage generator 340, prism 350, balanced detector 360, changing circuit 370, amplitude measurer 380, sample 500, thin films 510, 520, 530, electrodes 540, 550, PEM 610, beam splitter 615, first HWP 620, mirror 625, sample 630, second HWP 635, function generator 640, prism 650, balanced detector 660, multiplier 670, lock-in amplifier 680, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A spin-orbit torque (SOT) measuring apparatus, comprising:
    a photoelastic modulator (PEM) configured to periodically modulate a polarization direction of a linearly polarized incident light and emit a periodically modulated light;
    a first polarization rotator configured to rotate a polarization direction of the periodically modulated light;
    a voltage generator configured to generate an alternating current (AC) voltage to provide an AC current to a sample to which light with the rotated polarization direction is to be emitted;
    a prism configured to split light reflected by the sample into a first light and a second light having different polarization directions;
    a balanced detecting circuit configured to output a signal corresponding to an intensity difference between the first light and the second light;
    a changing circuit configured to change a frequency component corresponding to a frequency of the AC voltage among frequency components comprised in the signal corresponding to the intensity difference; and
    an amplitude measurer configured to measure an amplitude of a frequency component corresponding to a modulation frequency of the PEM among frequency components comprised in a signal with the changed frequency component,
    wherein a SOT generated in the sample in response to the AC current is calculated based on the measured amplitude.

2. The SOT measuring apparatus of claim 1, wherein the PEM is further configured to:
    perform the modulating by periodically changing the polarization direction of the linearly polarized incident light as linearly polarized light and circularly polarized light.

3. The SOT measuring apparatus of claim 1, wherein the changing circuit is further configured to:
    change the frequency component corresponding to the frequency of the AC voltage by multiplying the frequency components comprised in the signal corresponding to the intensity difference by a frequency component corresponding to a frequency of the AC current applied to the sample.

4. The SOT measuring apparatus of claim 1, wherein the amplitude measurer is further configured to:
measure the amplitude of the frequency component corresponding to the modulation frequency of the PEM using a reference signal based on a period on which the polarization direction of the light is repeated as linearly polarized light and circularly polarized light in the PEM.

5. The SOT measuring apparatus of claim 1, wherein the changing circuit is further configured to:
change a frequency component corresponding to a frequency of the periodically modulated light among the frequency components comprised in the signal corresponding to the intensity difference, and
the amplitude measurer is further configured to:
measure the amplitude of the frequency component corresponding to the modulation frequency of the PEM using a reference signal based on the frequency of the AC voltage.

6. The SOT measuring apparatus of claim 1, wherein the sample comprises:
a plurality of thin films of a 3-layer structure having a thickness of nanometers, wherein the thin films comprise a first thin film of heavy metal, a first magnetic thin film of ferromagnetic metal, and a second thin film of heavy metal; and
a plurality of electrodes configured to supply the AC current to the thin films,
wherein, when current flows in a direction parallel to the electrodes, the rotated polarization direction changes by a change in a magnetized component in an axial direction orthogonal to the direction parallel to the electrodes in the first magnetic thin film.

7. The SOT measuring apparatus of claim 1, wherein a magnetic random-access memory (MRAM) comprises the sample.

8. The SOT measuring apparatus of claim 1, further comprising:
a beam splitter configured to refract, to the sample, at least a portion of the periodically modulated light.

9. The SOT measuring apparatus of claim 8, further comprising:
a mirror configured to reflect the portion of the periodically modulated light refracted and transfer the portion of the periodically modulated light reflected to the prism.

10. The SOT measuring apparatus of claim 1, further comprising:
a second polarization rotator configured to rotate a polarization direction of the light reflected by the sample such that the light reflected by the sample is comprised in a predetermined voltage range detectable by the balanced detecting circuit.

11. A spin-orbit torque (SOT) measuring method, comprising:
periodically modulating a polarization direction of a linearly polarized incident light and emitting a periodically modulated light;
rotating a polarization direction of the periodically modulated light;
generating an alternating current (AC) voltage to provide an AC current to a sample to which light with the rotated polarization direction is to be emitted;
splitting light reflected by the sample into a first light and a second light having different polarization directions;
outputting a signal corresponding to an intensity difference between the first light and the second light;
changing a frequency component corresponding to a frequency of the AC voltage among frequency components comprised in a signal corresponding to the intensity difference;
measuring an amplitude of a frequency component corresponding to a modulation frequency of a photoelastic modulator (PEM) among frequency components comprised in a signal with the changed frequency component; and
calculating a SOT generated in the sample in response to the AC current based on the measured amplitude.

12. The SOT measuring method of claim 11, wherein the modulating and the emitting comprises:
performing the modulating by periodically changing the polarization direction of the linearly polarized incident light as linearly polarized light and circularly polarized light.

13. The SOT measuring method of claim 11, wherein the changing of the frequency component comprises:
changing the frequency component corresponding to the frequency of the AC voltage by multiplying the frequency components comprised in the signal corresponding to the intensity difference by a frequency component corresponding to a frequency of the AC current applied to the sample.

14. The SOT measuring method of claim 11, wherein the measuring of the amplitude of the frequency component comprises:
measuring the amplitude of the frequency component corresponding to the modulation frequency of the PEM, using a reference signal based on a period on which the polarization direction of the light is repeated as linearly polarized light and circularly polarized light in the PEM.

15. The SOT measuring method of claim 11, wherein the changing of the frequency component comprises:
changing the frequency component corresponding to the frequency of the periodically modulated light among the frequency components comprised in the signal corresponding to the intensity difference, and
the measuring of the amplitude of the frequency component comprises:
measuring the amplitude of the frequency component corresponding to the modulation frequency of the PEM, using a reference signal based on the frequency of the AC voltage.

16. The SOT measuring method of claim 11, wherein the sample comprises:
a plurality of thin films of a 3-layer structure having a thickness of nanometers, wherein the thin films comprise a first thin film of heavy metal, a first magnetic thin film of ferromagnetic metal, and a second thin film of heavy metal; and
a plurality of electrodes configured to supply the AC current to the thin films,
wherein, when current flows in a direction parallel to the electrodes, the rotated polarization direction changes by a magnetized component in an axial direction orthogonal to the direction parallel to the electrodes in the first magnetic thin film.

17. The SOT measuring method of claim 11, wherein a magnetic random-access memory (MRAM) comprises the sample.

18. The SOT measuring method of claim 11, further comprising:

refracting, to the sample, at least a portion of the periodically modulated light.

19. The SOT measuring method of claim 11, further comprising:
rotating a polarization direction of the light reflected by the sample such that the light reflected by the sample is comprised in a predetermined voltage range detectable by a balanced detecting circuit.

20. A non-transitory computer-readable storage medium storing instructions that, when executed by one or more processors, configure the one or more processors to perform the SOT measuring method of claim 11.

* * * * *